Patented June 26, 1945

2,378,988

UNITED STATES PATENT OFFICE 2,378,988

CONDENSATION OF ALDEHYDES WITH KETONES

Henry Dreyfus and James Gordon Napier Drewitt, London, England; said Drewitt assignor to British Celanese Limited, London, England, a company of Great Britain No Drawing. Application August 13, 1943, Serial No. 498,578. In Great Britain June 10, 1942

8 Claims. (Cl. 260—594)

This invention relates to the production of keto-alcohols by the condensation of aliphatic aldehydes with aliphatic ketones. It further relates to the transformation of such keto-alcohols into other useful products, e. g. glycols or unsaturated ketones.

It is known that under alkaline conditions aliphatic ketones will condense with aliphatic aldehydes to give a variety of products, ranging from the simple keto-alcohols derived from equimolecular proportions of the reactants, to complex resins. An example of such a condensation is the formation of butanol-1-one-3 from acetone and formaldehyde. In this particular case, when operating under the conditions hitherto proposed, only low yields of the butanol-1-one-3 are obtainable, since a variety of side reactions occur with production of large amounts of resins, or of bodies which, although not resinous, are derived from one molecule of acetone and two or more molecules of formaldehyde.

Similar considerations apply to the production of the simple keto-alcohols from aliphatic aldehydes and ketones generally, but the difficulties are perhaps most serious in the case of the condensation of acetone and formaldehyde. The invention will, therefore be described with special reference to this particular condensation.

It has now been found that good yields of butanol-1-one-3 can be obtained by condensation of acetone with formaldehyde in a slightly alkaline reaction medium containing at least 7 moles of acetone, and preferably at least 10 moles, e. g. 10–60 or 20–40 moles, for each mole of formaldehyde, and an amount of water at least equal in weight to the formaldehyde present. Advantageously the water in the reaction medium amounts to several times, e. g. 10 to 30 times, the weight of the formaldehyde.

The formaldehyde is conveniently used in the form of the commercial 30–40% aqueous solution. Paraform is an alternative source of formaldehyde. A suitable reaction temperature is from 0 to 35° C. or 40° C., e. g. room temperature.

Any suitable alkaline catalyst may be employed, e. g. sodium or potassium carbonate, sodium hydroxide, barium hydroxide, sodium sulphite or sodium bisulphite. Although the last mentioned salt has an acid reaction it forms an alkaline bisulphite compound with formaldehyde or acetone. Hence, when using sodium bisulphite the effective catalyst is probably the alkaline sodium bisulphite compound of acetone or formaldehyde. In order to avoid undue loss of formaldehyde in side reactions, the alkalinity of the reaction medium should be kept low, e. g. between pH 8 and pH 10, especially between 8.5 and 9.5. Thus, when using potassium carbonate as catalyst, it has been found that a suitable amount is from 1 to 5 parts per 100 parts of formaldehyde. Since, however, formaldehyde solutions are generally slightly acid owing to the presence of formic acid, the amount of catalyst which must be added to the reactants may be slightly in excess of the above figures. With alkaline catalysts other than potassium carbonate, it is preferred to employ an amount giving the same pH as the amount of potassium carbonate specified.

The formaldehyde, or both the formaldehyde and catalyst, can, if desired, be added slowly to the other ingredients of the reaction mixture, so that at any given time the amount of formaldehyde actually present is very small.

Again it is possible to build up the concentration of the keto-alcohol in the reaction medium by adding more formaldehyde, and if necessary more catalyst and acetone, after all the formaldehyde originally present has reacted. This particular procedure results in economy in the working up of the keto-alcohol.

The isolation of the keto-alcohol can, if desired, be effected by neutralising or rendering slightly acid the reaction mixture with, for example, acetic acid, distilling off the acetone and some of the water at atmospheric pressure, and then distilling off the remainder of the water under reduced pressure. When barium hydroxide has been used as the catalyst it can be removed by precipitation with carbon dioxide.

It is also possible to separate the keto-alcohol by "salting-out" from the reaction mixture before or after removal of the acetone. Good results are obtained by a combination of "salting-out," e. g. with ammonium sulphate, and solvent extraction, e. g. with methylene chloride. The final purification of the keto-alcohol may be effected by distillation under reduced pressure, preferably below 20 mm.

The invention is illustrated by the following examples, all parts being by weight:

Example 1

1000 parts of acetone and 100 parts of "40% formalin" are mixed with 1 part of potassium carbonate in 600 parts of water. The reaction mixture is allowed to stand at room temperature (20° C.) for 24 hours, or until a portion after dilution with twice its volume of water gives no precipitate with aniline acetate solution after 10 minutes. It is then rendered slightly acid with acetic acid and the acetone and part of the water removed by distillation on a water-bath at atmospheric pressure. The remainder of the water is removed by evaporation at about 40 mm. pressure, again on a water-bath, and the residual keto-alcohol contaminated with a small amount of more complex condensation products is fractionated at 15 mm. pressure. The butanol-1-one-3 passes over in the fraction at about 75–85° C. under this pressure.

*Example 2*

1600 parts of acetone and 300 parts of water are mixed with 33 parts of N/10 caustic soda and 70 parts of 40% formalin at 30° C. The mixture is stirred for about 35 minutes at this temperature, and the butanol-1-one-3 is then isolated as in Example 1.

The added 300 parts of water in Example 2 can be omitted without greatly affecting the other reaction conditions.

*Example 3*

250 parts of acetone, 100 parts of water, 30 parts of 40% formalin and 2 parts of a 10% w/v aqueous solution of sodium sulphite

(Na₂SO₃7H₂O)

are stirred together at 30° C. until the reaction mixture gives no formaldehyde reaction when tested as described above. The butanol-1-one-3 is then isolated as in Example 1.

The keto-alcohol obtained as described above can be converted into other useful products, either after isolation or in the reaction medium, preferably after removal of the excess acetone. Thus, by hydrogenation with a nickel catalyst, e. g. Raney nickel, it is possible to prepare 1.3-butylene glycol, while by dehydration, e. g. by heating to 100–130° with a small amount of zinc chloride or iodine methyl vinyl ketone is formed.

Although the invention has been described with particular reference to the condensation of acetone and formaldehyde, it is in no way limited thereto, and is applicable also to the condensation of acetone with aldehydes other than formaldehyde, e. g. acetaldehyde, and to the condensation of other ketones with aldehydes generally, e. g. the condensation of methyl ethyl ketone with formaldehyde. As in the case of butanol-1-one-3 the products can be hydrogenated to diols or dehydrated to unsaturated ketones.

An example of the condensation of methyl ethyl ketone with formaldehyde, in accordance with the present invention, is given below:

*Example 4*

300 parts of methyl ethyl ketone are mixed with 35 parts of 40% formalin and 75 parts of water and the mixture cooled with stirring to 10° C. 15 parts of N/10 caustic soda and 75 parts of water are then added during ½ hour at about 10° C. The reaction mixture is stirred for a further 4 hours at the same temperature and then left for 17 hours at 5° C. Isolation of the product as in Example 1 gives a good yield of 2-methyl-butanol-1-one-3 in the fraction boiling at 93–95° C. at approximately 12 mms.

Having described our invention what we desire to secure by Letters Patent is:

1. Process for the production of keto-alcohols which comprises condensing an aliphatic aldehyde with an aliphatic ketone in an alkaline medium containing a molar ratio of ketone to aldehyde of at least 7:1 and an amount of water at least equal to the weight of the aldehyde.

2. Process for the production of butanol-1-one-3, which comprises condensing acetone with formaldehyde in an alkaline medium containing a molar ratio of acetone to formaldehyde of at least 7:1 and an amount of water at least equal to the weight of the aldehyde.

3. Process for the production of butanol-1-one-3, which comprises condensing acetone with formaldehyde in an alkaline medium containing a molar ratio of acetone to formaldehyde of at least 7:1 and an amount of water from 10 to 30 times the weight of the aldehyde.

4. Process for the production of keto-alcohols which comprises condensing an aliphatic aldehyde with an aliphatic ketone in an alkaline medium containing from 10 to 60 moles of ketone for each mole of aldehyde, and an amount of water at least equal to the weight of the aldehyde.

5. Process for the production of butanol-1-one-3, which comprises condensing acetone with formaldehyde in an alkaline medium containing from 10 to 60 moles of acetone for each mole of formaldehyde and containing an amount of water at least equal to the weight of the aldehyde.

6. Process for the production of butanol-1-one-3, which comprises condensing acetone with formaldehyde in an alkaline medium containing from 20 to 40 moles of acetone for each mole of formaldehyde and containing an amount of water at least equal to the weight of the aldehyde.

7. Process for the production of keto-alcohols which comprises condensing an aliphatic aldehyde with an aliphatic ketone containing from 3 to 4 carbon atoms in an alkaline medium containing a molar ratio of ketone to aldehyde of at least 7:1 and an amount of water at least equal to the weight of the aldehyde.

8. Process for the production of butanol-1-one-3, which comprises condensing acetone with formaldehyde in an alkaline medium containing a molar ratio of acetone to formaldehyde of at least 7:1, an amount of water at least equal to the weight of the aldehyde, and an alkaline reacting substance selected from the group consisting of alkali metal hydroxides, carbonates and sulphites.

HENRY DREYFUS.
JAMES GORDON NAPIER DREWITT.